(12) United States Patent
Nilsson

(10) Patent No.: US 6,595,157 B1
(45) Date of Patent: Jul. 22, 2003

(54) METHOD AND DEVICE FOR POSITIONING TEAT CUPS ON A MILKING ANIMAL

(75) Inventor: Mats Nilsson, Tumba (SE)

(73) Assignee: DeLaval Holding AB, Tumba (SE)

(*) Notice: Subject to any disclaimer, the term of this patent is extended or adjusted under 35 U.S.C. 154(b) by 0 days.

(21) Appl. No.: 09/857,890

(22) PCT Filed: Jan. 13, 2000

(86) PCT No.: PCT/SE00/00049
§ 371 (c)(1),
(2), (4) Date: Jul. 31, 2001

(87) PCT Pub. No.: WO00/41559
PCT Pub. Date: Jul. 20, 2000

(30) Foreign Application Priority Data

Jan. 15, 1999 (SE) .................................. 9900110

(51) Int. Cl.$^7$ ............................... A01J 3/00; A01J 5/00
(52) U.S. Cl. .................................................. 119/14.08
(58) Field of Search .......................... 119/14.08, 14.02, 119/14.14, 14.03

(56) References Cited

U.S. PATENT DOCUMENTS

| 5,568,788 A | * | 10/1996 | van den Berg et al. ... 119/14.02 |
| 5,743,209 A | * | 4/1998 | Bazin et al. ............... 119/14.08 |
| 5,918,566 A | * | 7/1999 | van den Berg ........... 119/14.02 |
| 5,996,529 A | * | 12/1999 | Sissom et al. ............ 119/14.14 |
| 6,050,219 A | * | 4/2000 | van der Lely ............ 119/14.08 |
| 6,148,766 A | * | 11/2000 | van der Lely ............ 119/14.08 |
| 6,209,485 B1 | * | 4/2001 | van der Lely et al. .... 119/14.02 |
| 6,234,109 B1 | * | 5/2001 | Andersson et al. ....... 119/14.08 |
| 6,263,832 B1 | * | 7/2001 | van den Berg ........... 119/14.08 |
| 6,269,767 B1 | * | 8/2001 | Hoppe et al. ............. 119/14.47 |
| 6,363,883 B1 | * | 4/2002 | Birk .......................... 119/14.08 |

FOREIGN PATENT DOCUMENTS

| EP | A2 0332232 | 9/1989 |
| EP | A2 0643907 | 3/1995 |
| EP | A1 0657098 | 6/1995 |
| EP | A1 0824857 | 2/1998 |
| GB | A 2325141 | 11/1998 |
| WO | A1 9620587 | 7/1996 |

* cited by examiner

Primary Examiner—Charles T. Jordan
Assistant Examiner—Susan C. Alimenti
(74) Attorney, Agent, or Firm—Birch, Stewart, Kolasch & Birch, LLP

(57) ABSTRACT

The present invention relates to a method for positioning an animal related member, e.g. teat cups, of a milking animal, more specifically to a method to initialize an automatic positioning device to utilize a sequence of movements associated with the animal. The sequence of positioning movements is associated with a class to which the animal belongs among a plurality number of classes corresponding to the identity of the animal. The animal is beforehand assigned to a class based on its individual position of each teat. The different sequence of movements, for different shapes of udders on the animal, may speed up the process for positioning the teat cups and thereby increase the through-put of animals in the system. The present invention also relates to a control device.

32 Claims, 2 Drawing Sheets

METHOD AND DEVICE FOR POSITIONING TEAT CUPS ON A MILKING ANIMAL

This application is the national phase under 35 U.S.C. §371 of PCT International Application No. PCT/SE00/00049 which has an International filing date of Jan. 13, 2000, which designated the United States of America and was published in English.

TECHNICAL FIELD

The present invention relates to a method for positioning animal related means, e.g. teat cups, relative to a defined part of an animal, e.g. a milking animal, as is set forth in the preamble of claim 1, more specifically to a method to initialize an automatic positioning device to utilize a sequence of movements associated with said animal. The present invention also relates to a control device.

DESCRIPTION OF RELATED ART

Present automatic milking systems comprise an automatic positioning device, such as a robot arm with identifying means. The positioning device normally utilizes a predetermined sequence of movements to locate and identify teats on an udder of a milking animal. The udder of a milking animal, such as a cow, may have different shapes and the teats on the udder may be positioned differently. In spite of these variations a single sequence of movements is normally used, which results in that the teats on some animals cannot be found within a predetermined time limit. Such animals may then have to be rejected since they cannot be milked using this system.

Furthermore, a shift in position of the teats occurs over time, in particular in the case of a young animal, in which the size of the udder increases with growth, which in turn gives rise to greater distances between teats. If substantial changes arise, the animal may be rejected by the system.

In case of an adult animal it has been found that fluctuating milk yield occurs per visit to the milking robot. Due to the fact that the milk yield varies will the teat position per milking animal vary through greater or lesser tension of the udder, affected by the fluctuating quantity of the milk present therein.

Furthermore, during the period between two calvings the yield increases during the first months and decreases again thereafter. This will also lead to a change in the distances between the teats.

In WO 96/20587 a method is disclosed for regularly checking the position of the teats for positioning teat cups on milking animals addressing the problem related to teats that are not in the same position on a subsequent visit. Readjustments of he the position is necessary, which is recorded as a new position for the next visit. The positioning of the teat cups on to the teats is initially done manually to get an initial position of the teats. During the checking only the adjustments from the initial position is stored.

This way of introducing a new animal to an automatic milking system is time consuming, especially if the milking system is introduced to a stock of animals.

SUMMARY OF THE INVENTION

The object with the present invention is to provide a method and a control device for positioning teat cups on a milking animal which overcomes the prior art problems.

The object is achieved by a method for positioning at least one animal related means relative to at least one defined part of an animal, said animal occupying a defined space provided with an automatic positioning device, said method comprising the steps of:

obtaining an identity of said animal, determining a class to which the animal belongs among a plurality of classes corresponding to the identity of said animal, the animal being beforehand assigned to a class based on its individual position of each defined part, initializing said automatic positioning device to utilize a sequence of positioning movements associated with the class, and positioning said animal related means using said sequence of movements, whereby the process for positioning the animal related means is adapted for varying positions of each defined parts of said animal.

The specific problem with introducing a new animal to the above mentioned system is solved by a method according to claim 9.

The object is also achieved by a control device for positioning animal related means relative to defined parts of an animal, according to claim 14.

An advantage with the present invention is that animals with unusually shaped udders, having teats positioned in an undesired way, may still be allowed in the automatic milking system instead of being discarded from the system. A discarded animal must either be sold or slaughtered, which may be costly for the owner of the animals.

Another advantage is that by using a plurality of classes the sequences of movements, adapted for different shapes of udders on the animal, may speed up the process for positioning the teat cups and thereby increase the through-put of animals in the system.

An advantage, with a further embodiment of the invention, is that by assigning a basic sequence of movements for new animals, they may be introduced without any manual assistance.

A still further advantage, with a still further embodiment, is that the behavior of a milking animal is taken into consideration when assigning a sequence of movements, so that, for example, the animals are not disturbed by the positioning device and/or the positioning device is not damaged due to animal movements.

The invention will now be described in more detail with reference to the accompanying drawings.

DETAILED DESCRIPTION OF PREFERRED EMBODIMENTS

Figure 1:
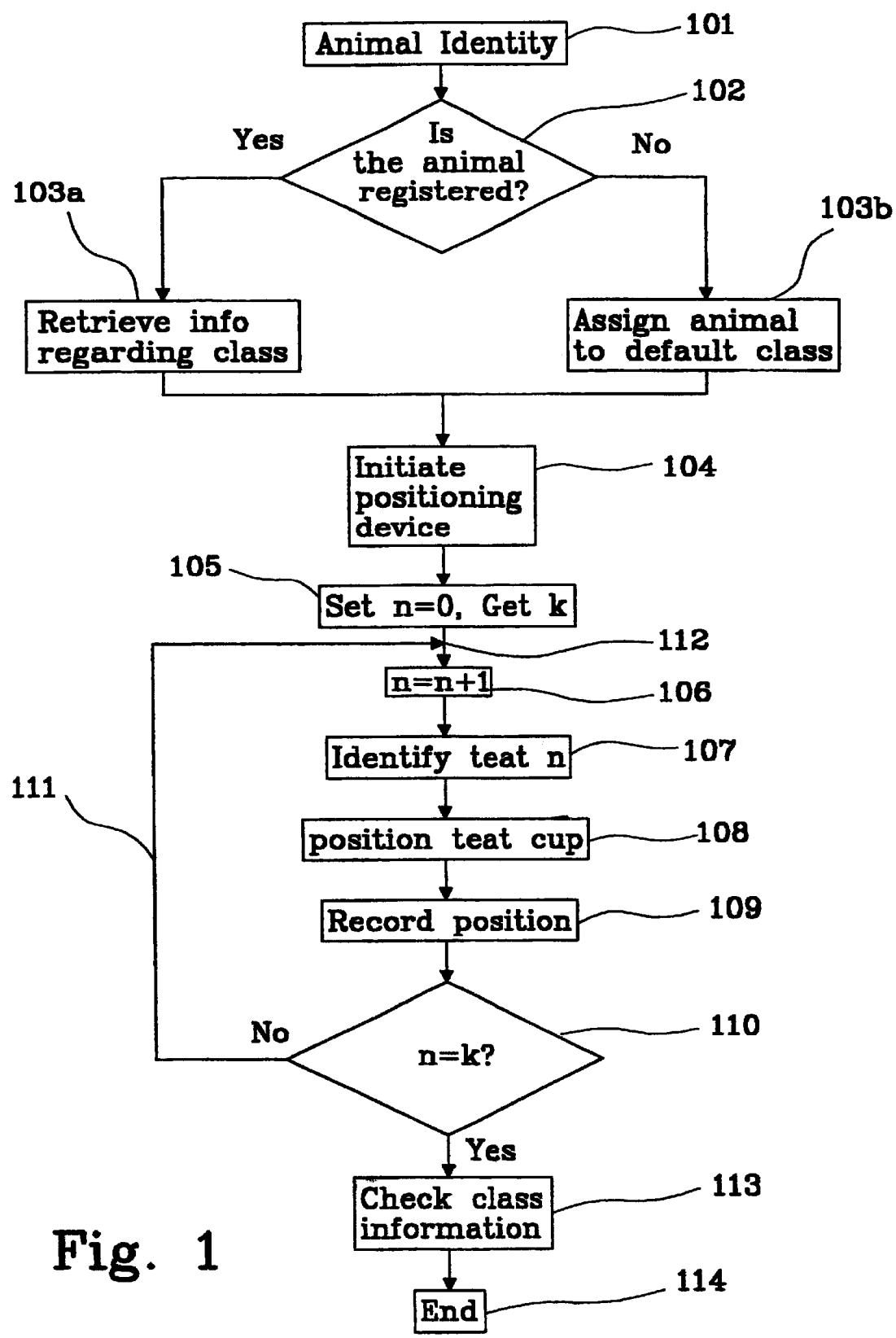
FIG. 1 shows a flow chart describing the present invention.

FIG. 1 shows a flow chart describing the present invention for positioning of teat cups relative to teats of a milking animal, such as a cow, in an automatic milking system.

The flow starts in box 101, where the system receives information regarding the animals identity. A computer uses that information to determine if that animal previously has been subject to milking in this milking system, as is illustrated by box 102.

If the animal has been subject to previous milking, a registration in a memory and classification regarding said animal have been made earlier. According to the present invention, the classification is performed by classifying means that assign said milking animal to one class out of a plurality of classes. Such a plurality of classes may, as an example, be limited to consist of classes 0–5. In box 103a the system retrieves information regarding which class said animal belongs to, for instance class 3. In this example class 3 could mean that the distance between the fore teats is much larger than what is usual.

It is possible to extend the number of classes in the system so that each animal has its own individual class.

If the animal is not presently registered in the system the flow proceeds to box 103b, where the system assigns a default class to the animal, for instance class 0.

The system also comprises an automatic positioning device being initialized, in box 104, to use a sequence of positioning movements, associated with said class of the animal, to identify said positions of the teats. Both boxes 103a and 103b are connected to box 104. The associated sequence of movements may be very different with respect to the different classes. A default sequence for the default class, in this example class 0, is more extensive than all the other sequences of movements, because it must cover all the other classes. The rest of the classes are designed to optimize the sequence of movements dependent of the shapes of the udders and the positions of the teats within the ranges of that particular class.

After having been subjected to the sequence of movements related to the default class, class 0, the animal may now be assigned to a more specific class based on the findings with respect to udder shape and teat positions.

In box 105 a counter n is set to zero (n=0) and the number of teats k for this type of animal is retrieved from the system. An increment of n to n+1 is performed in box 106, which causes the positioning device to perform the sequence of movements to identify teat number 1 (n=1), as illustrated in box 107.

A teat cup for teat 1 is positioned, box 108, and the position of the teat is recorded and stored in the system memory illustrated by box 109.

In box 110, a comparison between the sequence number of presently processed teat n and the total number of teats k is performed, if the numbers are not equal the flow is fed back, via line 111, to a point 112, between box 105 and 106.

The steps 106 to 110 are repeated until n=k and the flow proceeds to box 113, where a comparison between the ranges of positions of the assigned class for this animal and the recorded positions for all teats is done. Dependent on the result of this comparison the animal may be reassigned to a new class, which information is stored in the system to be used on the next visit.

The flow ends in box 114.

This flow is repeated every time an animal enters the milking system to be milked.

The animals may also be classified dependent on their behavior during the previously described process flow. The flow only needs to be complemented with a box containing means for detecting behavior during the positioning and extend the number of available classes to contain some classes depending on the behavior.

An animal may either be assigned to one class, being a combined class of the teat positions and the behavior, or the animal may be assigned to two separate classes, one for teat positions and one for behavior.

If the shape of an udder or the teats position on the udder is altered between two subsequent milking events, and the assigned sequence of movements still can identify the teats, the system may reassign the animal to a different class corresponding to the new position of the teats.

On the other hand, if the assigned sequence of movements does not identify the position of the teats within a predetermined time period, the system may reassign the animal to a different class and repeat the positioning with another sequence of movements. A reassignment is preferably made to the default class.

Figure 2:
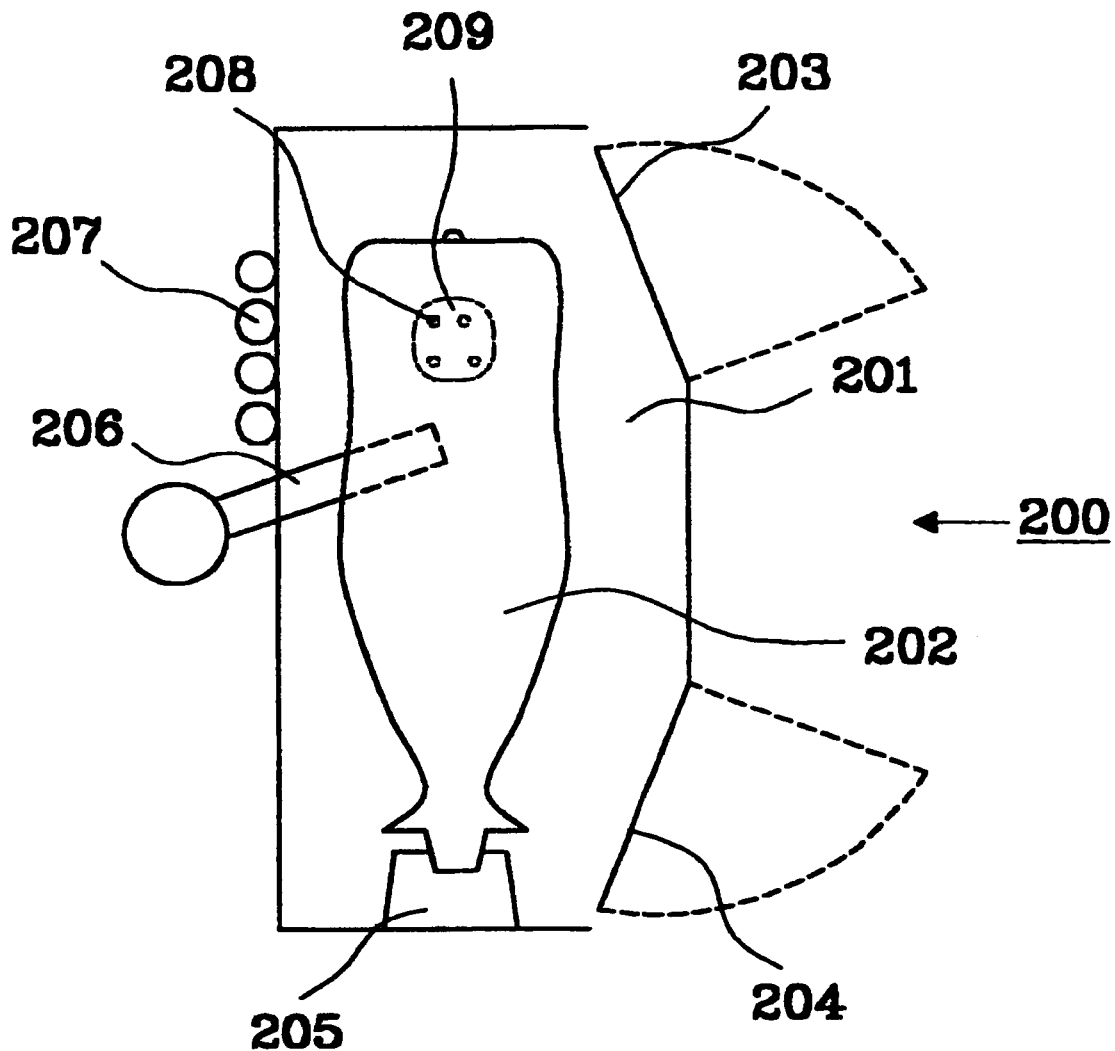
FIG. 2 shows a plan view of a part of a milking system.

FIG. 2 shows a part of a milking system 200 comprising a parlour 201, which is provided with an entrance door 203 at the rear longitudinal side, via which an animal 202 can enter the milking parlour 201, and with an exit door 204 at the front longitudinal side, via which the animal can leave the milking parlour 201. At the front of the parlour 201 there is furthermore disposed a feeding trough 205 in which fodder, such as concentrate, can be fed to the animal 202. The doors are operated by means of a computer (not shown).

The milking system further comprises a milking robot 206 for automatic positioning of teat cups 207 relative to teats 208 on an udder 209 of the milking animal 202. The milking system is also provided with an automatic detection system for identifying said animal (not shown).

The inventive methods and device may naturally be used to position any kind of animal related means relative to any desired part of an animal.

What is claimed is:

1. A method for positioning at least one animal related means relative to at least one teat of a milking animal wherein an animal occupying a defined space is provided with an automatic positioning device comprising the steps of:

obtaining an identity of an animal, determining a class, to which an animal belongs among a plurality of classes, corresponding to the identity of an animal, wherein an animal is beforehand assigned to a class based on an individual location of each teat, initializing said automatic positioning device to utilize a sequence of positioning movements associated with the class, and positioning said animal related means using said sequence of movements, whereby the process for positioning the animal related means is adapted for varying locations of each teat of said animal.

2. Method according to claim 1, and farther comprising the step of:

comparing an established location of said at least one teat with a predetermined range of locations associated with the assigned class for an animal, and updating the class assignment if said established location is outside said predetermined range.

3. Method according to claim 1, wherein selecting said plurality of classes to contain a default class having a basic sequence of movements associated with said default class, to which default class an animal is reassigned when the automatic positioning device fails to establish a location of the at least one teat utilizing the sequence of positioning movements associated with the assigned class.

4. Method according to claim 1, wherein selecting said animal relating means to be a teat cup, selecting said teat of said milking animal, the milking animal being a cow, and selecting said defined space to be a parlour of an automatic milking system having a teat cup attachment device.

5. Method according to claim 4, and further comprising the steps of:

(a) moving of said positioning device in a sequence of movements, corresponding to said class, to establish a location of said teat, (b) applying said teat cup to said teat, (c) recording the location of said teat, and (d) repeating step (a) to (c) to establish said location, applying said teat cup and recording the location for all present teats on a milking animal, whereby an adapted sequence of movements is applied for a specific class establishing said location for each teat one by one.

6. Method according to claim 4, said method further comprises a step of recording the behavior of a milking animal during the positioning, and said updating further comprises the step of:

updating the class assignment to which an animal belongs emanating from said identified positions of the teats and/or the behavior of the milking animal, whereby the method for positioning of the teat cups is adapted for different positions of the at least one teat and/or the behavior of said milking animal.

7. Method according to claim 1, wherein said plurality of classes are selected to be a limited number of classes.

8. A method for automatic treatment of an animal occupying a defined space, provided with an automatic positioning device for positioning at least one animal related means relative to at least one teat of a milking animal, said method comprising the steps of:

obtaining the identity of an animal, defining a plurality of classes to one of which an animal is assigned, each class is based on an individual location of each teat, defining for each class a sequence of movements to be performed by the positioning device, establishing the location of each teat, and assigning an animal to one of said classes based on the established position and relating the identity of an animal to said one class, allowing thereby the operation of the positioning device to be adapted to an animal using its identity.

9. Method according to claim 8, and further comprising the step of:

establishing the location of said at least one teat by initializing said automatic positioning device to use a basic sequence of movements.

10. Method according to claim 9, and further comprising the steps of:

selecting said plurality of classes to contain a default class having said basis sequence of movements associated with said default class, and assigning said animal to said default class prior to the step of establishing the location of said at least one teat.

11. Method according to claim 8, wherein said animal relating means is a teat cup, selecting said teat of said milking animal, the milking animal being a cow, and selecting said defined space to be a parlour of an automatic milking system having a teat cup attachment device.

12. Method according to claim 8, wherein said plurality of classes is selected to be a limited number of classes.

13. A control device for positioning at least one animal related means relative to at least one teat of milking animal, said animal occupying a defined space provided with an automatic positioning device, wherein said device comprises:

an arrangement for obtaining an identity of an animal, an arrangement for determining a class to which an animal belongs among a plurality of classes corresponding to the identity of an animal being beforehand assigned to a class based on an individual location of each teat, an arrangement for initializing the automatic positioning device to utilize a sequence of positioning movements associated with the class, and an arrangement for positioning said animal related means using said sequence of positioning movements, whereby the control device for positioning of the animal related means is adapted for different locations of each teat of said animal.

14. Device according to claim 13, wherein said device further comprises an arrangement for comparing established locations of said teats with a predetermined range of locations of the assigned class for an animal, and an arrangement for updating the class assignment if said established location is outside said predetermined range.

15. Device according to claim 13, wherein said animal relating means is a teat cup, said teat of said milking animal, the milking animal being a cow, and said defined space is a parlour of an automatic milking system having a teat cup attachment device.

16. Device according to claim 13, wherein said plurality of classes is a limited number of classes.

17. A method for positioning at least one animal related means relative to at least one defined part of an animal wherein an animal occupying a defined space is provided with an automatic positioning device comprising the steps of:

obtaining an identity of an animal, determining a class, to which an animal belongs among a plurality of classes, corresponding to the identity of an animal, wherein an animal is beforehand assigned to a class based on an individual positioning of each defined part, initializing said automatic positioning device to utilize a sequence of positioning movements associated with the class, positioning said animal related means using said sequence of movements, and updating the class assignment based on the position of said at least one defined part as established by said positioning device, whereby the process for positioning the animal related means is adapted for varying positions of each defined part of an animal.

18. Method according to claim 17, and further comprising the step of:

comparing the established position of said at least one defined part with a predetermined range of positions associated with the assigned class for an animal, and updating the class assignment if said established position is outside said predetermined range.

19. Method according to claim 17, wherein selecting said plurality of classes to contain a default class having a basic sequence of movements associated with said default class, to which default class an animal is reassigned when the automatic positioning device fails to establish the position of the at least one defined parts utilizing the sequence of positioning movements associated with the assigned class.

20. Method according to claim 17, wherein selecting said animal relating means to be a teat cup, selecting said defined part to be a teat of a milking animal, such as a cow, and selecting said defined space to be a parlour of an automatic milking system having a teat cup attachment device.

21. Method according to claim 20, and further comprising the steps of:
   (a) moving of said positioning device in a sequence of movements, corresponding to said class, to establish a position of a teat,
   (b) applying said teat cup to said teat,
   (c) recording the position of said teat, and
   (d) repeating step (a) to (c) to establish a position, applying said teat cup and recording the position for all present teats on a milking animal,
whereby an adapted sequence of movements is applied for a specific class establishing said position for each teat one by one.

22. Method according to claim 20, said method further comprises a step of recording the behavior of a milking animal during the positioning, and said updating further comprises the step of:
   updating the class assignment to which an animal belongs emanating from said identified positions of the teats and/or the behavior of the milking animal,
whereby the method for positioning of the teat cups is adapted for different positions of the at least one teat and/or the behavior of said milking animal.

23. Method according to claim 17, wherein said plurality of classes are selected to be a limited number of classes.

24. A method for automatic treatment of an animal occupying a defined space, provided with an automatic positioning device for positioning at least one animal related means relative to at least one defined part of an animal, said method comprising the steps of:
   obtaining the identity of an animal,
   defining a plurality of classes to one of which an animal is assigned,
   defining for each class a sequence of movements to be performed by the positioning device,
   establishing the position of each defined animal part,
   assigning an animal to one of said classes based on the established position and relating the identity of an animal to said one class, and
   updating the class based on the position of a defined part, allowing thereby the operation of the positioning device to be adapted to an animal using its identity.

25. Method according to claim 24, and further comprising the step of:
   establishing the position of said at least one defined animal part by initializing said automatic positioning device to use a basic sequence of movements.

26. Method according to claim 25, and further comprising the steps of:
   selecting said plurality of classes to contain a default class having said basis sequence of movements associated with said default class, and
   assigning said animal to said default class prior to the step of establishing the position of said at lest one defined animal part.

27. Method according to claim 24, wherein said animal relating means is a teat cup, selecting said defined part to be a teat of a milking animal, such as a cow, and selecting said defined space to be a parlour of an automatic milking system having a teat cup attachment device.

28. Method according to claim 24, wherein said plurality of classes is selected to be a limited number of classes.

29. A control device for positioning at least one animal related means relative to at least one defined part of an animal, said animal occupying a defined space provided with an automatic positioning device, wherein said device comprises:
   an arrangement for obtaining an identity of an animal,
   an arrangement for determining a class to which an animal belongs among a plurality of classes corresponding to the identity of an animal being beforehand assigned to a class based on an individual position of each defined part,
   an arrangement for initializing the automatic positioning device to utilize a sequence of positioning movements associated with the class,
   an arrangement for positioning said animal related means using said sequence of positioning movements, and
   an arrangement for updating the class assignment to which said animal belongs
based on the position of each defined part as established by said positioning device; whereby the control device for positioning of the animal related means is adapted for different positions of each defined part of an animal.

30. Device according to claim 29, wherein said device further comprises an arrangement for comparing the established positions of said defined parts with a predetermined range of positions of the assigned class.for an animal, and an arrangement for updating the class assignment if said established position is outside said predetermined range.

31. Device according to claim 29, wherein said animal relating means is a teat cup, said defined part is a teat of a milking animal, such as a cow, and said defined space is a parlour of an automatic milking system having a teat cup attachment device.

32. Device according to claim 29, wherein said plurality of classes is a limited number of classes.

* * * * *